Aug. 28, 1945.　　　A. H. BOELTER　　　2,383,703
NUT AND BOLT CAP
Filed Dec. 2, 1943

Inventor
ARTHUR H. BOELTER

By Clarence A. O'Brien
and Harvey B. Jacobson
Attorneys

Patented Aug. 28, 1945

2,383,703

UNITED STATES PATENT OFFICE 2,383,703

NUT AND BOLT CAP

Arthur H. Boelter, Appleton, Wis.

Application December 2, 1943, Serial No. 512,622

1 Claim. (Cl. 85—56)

This invention relates to new and useful improvements in safety devices and more particularly to means for preventing injury, especially around bowling alleys and elsewhere due to the presence of protruding nuts and bolt ends.

The principal object of the present invention is to provide a cap which can be readily disposed over exposed bolt ends and nuts so as to preclude the possibility of personal injury.

Other objects and advantages of the invention will become apparent to the reader of the following description.

Figure 1:
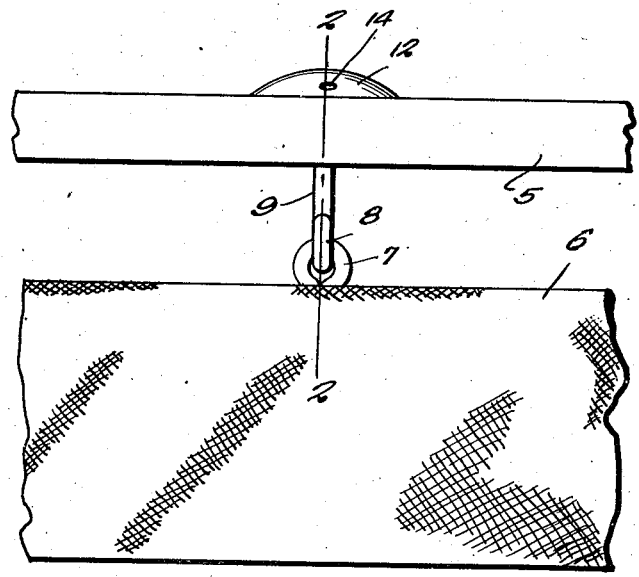
Figure 1 represents a fragmentary side elevational view showing a hook bolt supporting a bowling alley cushion with the exposed end and nut thereof covered by the present invention.
Figures 2, 3:
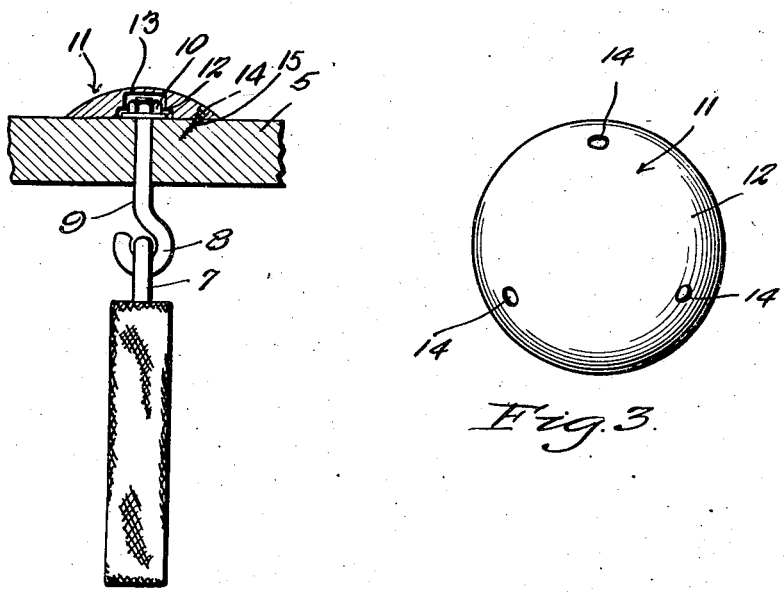
Figure 2 is a section taken substantially on the line 2—2 of Figure 1.
Figure 3 is a top plan view of the cap.

Referring to the drawing wherein like numerals designate like parts, it can be seen that for the purpose of illustration, numeral 5 denotes a bar such as is used around bowling alleys for supporting a cushion 6. These cushions 6 are usually provided with eyes 7 which engage over the hook ends 8 of hook bolts 9. These bolts 9 usually extend upwardly through the bar 5 and are equipped with nuts 10. Frequently these nuts and the upwardly protruding upper ends of the bolts 9 cause injury to pin boys and others who may chance to strike against the same.

Numeral 11 generally refers to the present invention and this is a convex-shaped cap member 12 of wood or any other inexpensive material formed with a recess extending inwardly from its flat side and denoted by numeral 13. This recess is sufficiently large to accommodate the usual washer and nut of the bolt 9 and also that portion of the bolt which may project upwardly from the nut.

The cap 12 has several openings 14 through which securing elements 15 may be driven to secure the cap firmly to the bar 5. These securing elements 15 are, of course, countersunk in the cap 12.

While the foregoing specification sets forth the invention in specific terms it is to be understood that numerous changes in the shape, size and materials may be resorted to without departing from the spirit and scope of the invention as claimed hereinafter.

Having described the invention, what is claimed as new is:

A cap for attachment to a flat surface over a nut and washer on a bolt, said cap comprising a solid dome-shaped body having a flat bottom face for engagement with said surface, the diameter of the flat base being at least four times the altitude of the dome thereby affording a relatively gentle slope to the curved surface and a stepped axial socket of a diameter not greatly exceeding the width of the surrounding surface extending inwardly thereof from said face and adapted to fit around said nut and washer to enclose the same, said body being provided with edge apertures adapted for the insertion of fastening screws therethrough.

ARTHUR H. BOELTER.